May 29, 1945.  E. C. HANLEY  2,376,855

COMBINATION SEPARABLE SALT AND PEPPER SHAKER

Filed Feb. 21, 1944

Inventor
Edmund C. Hanley
By *Liverance and Van Antwerp*
Attorneys

Patented May 29, 1945

2,376,855

UNITED STATES PATENT OFFICE 2,376,855

COMBINATION SEPARABLE SALT-AND-PEPPER SHAKER

Edmund C. Hanley, Muskegon, Mich.

Application February 21, 1944, Serial No. 523,195

6 Claims. (Cl. 65—45)

This invention relates to a combination separable salt and pepper shaker, and is concerned with the production of separate holders of salt and pepper or other condiments, each in itself capable of being used alone, and which may be located against each other at adjacent flat sides and releasably locked and held in such relation by a means having an outlet opening; and the opening may be turned to different positions so that either salt or pepper alone may be shaken out simultaneously and varying amounts of the one to the other, or the escape of both may be stopped.

It is an object and purpose of the present invention to provide a combination holder of the type noted which is economical to produce, attractive in appearance, easily connected together or disassembled and when connected and joined together will not accidentally disengage, an understanding of which may be had from the following description, taken in connection with the accompanying drawing, in which, Fig. 1 is a perspective view of the assembled combination shaker of my invention.

Like reference characters refer to like parts in the different figures of the drawing.

Figures 1, 2:
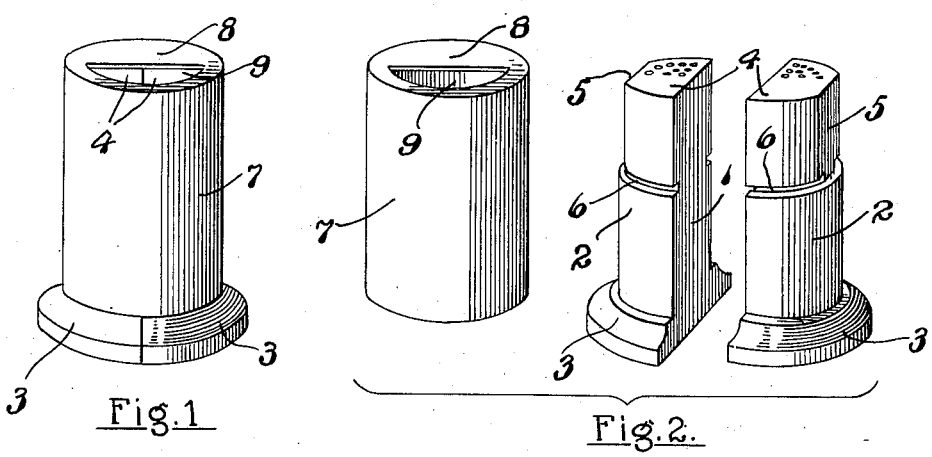
Fig. 2 shows perspective views of the three parts which are combined and assembled together in the form shown in Fig. 1.
Figures 5, 6:
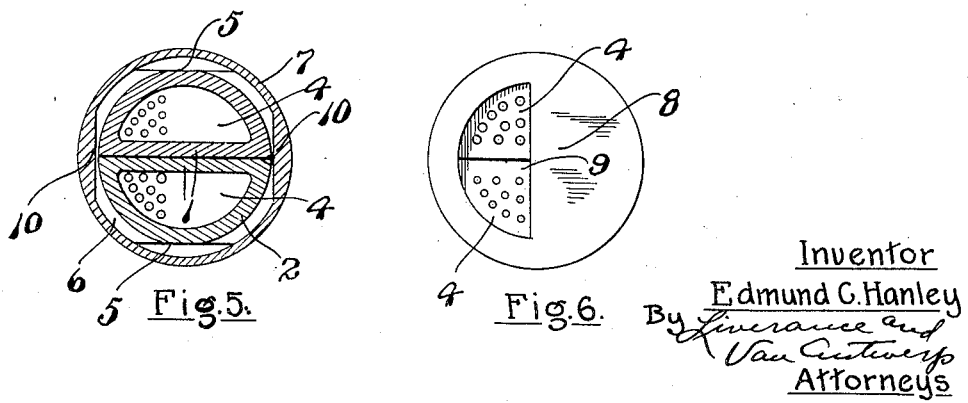
Fig. 5 is a horizontal section on the plane of line 5—5 of Fig. 4 looking in an upward direction.
Fig. 6 is a plan view of the top of the combination shaker.

The combination shaker includes two shaker members and an enclosing locking housing. The two shaker interior members are of identical construction, being hollow members with a flat vertical wall 1, a vertical cylindrical wall 2, the sides being extended downwardly and the outer cylindrical wall enlarged into a base member 3. Each of the members at its upper end has a top 4 and there is also a bottom, the several walls, top and bottom enclosing a chamber within which the particular condiment selected is held. The top 4 over substantially one-half of the surface thereof has a series of small openings as shown in Figs. 2, 5 and 6, those in one of the members preferably being larger than in the other, for the escape of the condiment held within upon shaking, as is well understood.

At the upper portion of each of the shaker members the outer curved wall 2 is cut away to provide a flat vertical surface 5 which may but not necessarily parallel the opposite vertical side 1. Said surface 5 extends downwardly part of the vertical height of the shaker member coming to a horizontal groove 6 cut around the curved wall 2 between its upper and lower ends as shown, the sides 5 being substantially flush with the bottoms of the grooves. Each of these shaker members is capable of being used by itself, and if one contains one condiment and the other another, as for example salt and pepper, either of said condiments may be shaken out through the openings in the top 4 in the usual manner.

Figures 3, 4:
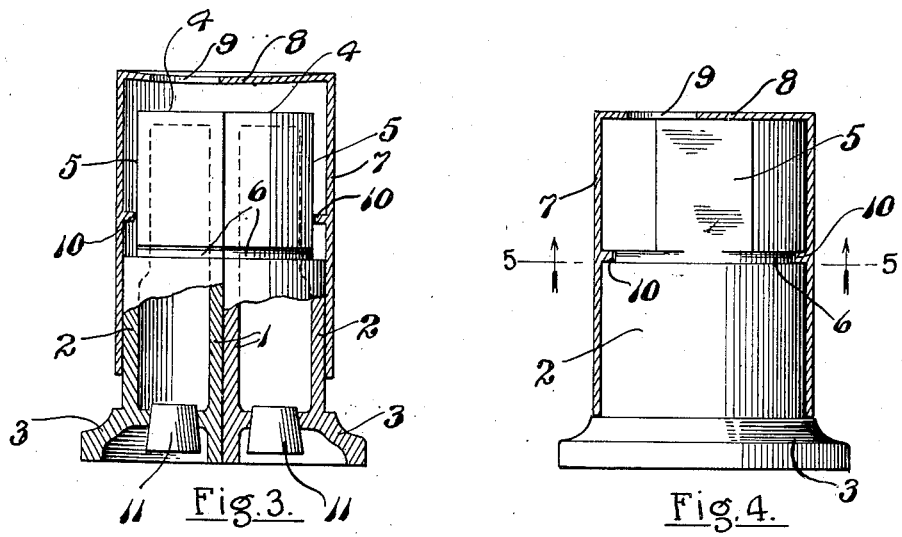
Fig. 3 is a vertical section with interior parts shown in side elevation illustrating the manner of assembling and connecting the parts of the combination shaker.
Fig. 4 is a side elevation of the interior members of the combined shaker, the outside locking enclosure being in vertical section.

The two shaker members are placed together with their vertical sides 1 against each other thereby providing a substantially cylindrical body above the base portions 3 over which a cylindrical housing 7 is adapted to be passed. The housing 7, of thin material, has a substantially horizontal top 8 with an opening 9 therein shaped substantially as of semi-circular form. And preferably the top 8 will be bowed or concaved slightly in a downward direction as in Fig. 3. The size of the opening 9 is such that it will expose substantially one-half of the two upper ends 4 of the shaker members covering the other half.

At opposite positions within the cylindrical shell 7, ribs 10 are provided which may be integral with or soldered to the walls of the part 7. Said ribs are of a shape such that they may pass downwardly at the outer side of the flat side portions 5 until the grooves 6 are reached whereupon by turning the covering shell about its vertical axis the ribs will traverse the grooves 6 thereby locking the parts together. When the locking members 10 are received within the grooves 6, the shell 7 will have been forced downwardly a sufficient distance that the bowed down under side of the top 8 will be pressed upwardly by engagement against the upper ends of the interior shaker members, as in Fig. 4, the tendency of which is to press the locking ribs 10 in an upward direction against the upper sides of the groove 6. This not only makes a snug and tight engagement against the upper ends of the interior shaker members but provides a friction brake against accidental or aimless movement of the covering shell with respect to the interior members over which it is placed. The lower end of the shell 7, when in its final closed position, bears against a suitable annular shoulder on the base members 3.

In the bottom of each of the shaker members an opening is made which may be closed by a cork 11 or other suitable removable closure for filling the shaker members when the supply therewithin becomes exhausted.

It is apparent that the outside covering or holding and locking housing may be turned on a vertical axis to different positions with respect to the inner members. In doing so the opening 9 will expose different small openings in the tops 4 of the shaker members, and in one position as shown in Fig. 1, all of the openings will be covered. In Fig. 6 all of the openings in the top member 4 are exposed. Any position in between the two positions shown in Fig. 1 and Fig. 6 may be occupied and accordingly the combination shaker may be used to supply either one of the condiments alone or any desired selected amounts of both of them in relation to each other; and further all of the outlet openings for the condiments may be completely closed to guard against any spilling or loss of the condiments which may be used.

The material from which the structure may be made is not any particularly essential feature of the invention. The interior members may be made of a cast metal such as aluminum or other metals, the shell 7 of a thin sheet metal such as brass or aluminum. Preferably however the material used for either or both the shell and shaker members is a plastic which is not subject to rusting or corrosion as are some metals exposed to contact with salt. Various plastics, for example, a Celluloid, Tenite or the like may be used and are preferred materials.

It is to be understood that the invention has been disclosed in a practical working embodiment which has been produced and used and operated satisfactorily in all respects. But the invention is not necessarily limited to the specific embodiment disclosed as there are variations in detail which may be resorted to in the manner of releasably locking the parts together and in securing the frictional insurance against accidental or aimless separation. The separation of the parts will occur when on turning the outer enclosing shell the locking ribs 10 come to the cutaway portions at 5 whereupon the outer housing may be removed. It is also apparent that the releasable locking of the parts together would be substantially attained by using one of the inwardly extending locking members 10 and having one only of the shaker members machined to provide the surface at 5 with a pin and hole connection of the two shaker members at their flat sides. Other variations in detail will occur to others skilled in the art.

The invention is defined in the appended claims and is to be considered comprehensive of all forms of structure coming within their scope.

1. A plurality of hollow shaker members of the class described comprising, each a semi-cylindrical hollow body having a flat side, said flat sides of the shaker members being adapted to be brought together to provide a substantially cylindrical body, each of said shaker members having a top with openings therethrough over a part of the top above the hollow chamber therewithin, said openings being disposed substantially in a sector of a circle and when the shaker members are placed with their flat sides in contact, said openings covering a larger sector, a cylindrical housing telescoping over the shaker members when thus located with respect to each other having a substantially flat top with a sector shaped opening therein, and interengaging means on said shaker members and at the inner sides of said housing for releasably securing the shaker members and housing together when the top of said housing has come to the upper side of the tops of said shaker members, said releasable interengaging means permitting rotation of the housing relative to the shaker members about the longitudinal vertical axis of said housing.

2. A construction containing the combination of elements as defined in claim 1, said interengaging means on the shaker members and the inner sides of said housing comprising, horizontal annular grooves around the curved sides of said shaker members between the upper and lower ends thereof, the ends of the grooves being in conjunction when the shaker members at their flat sides are placed together, and each shaker member at a part of the outer side thereof above the grooves being cut away from the upper end of each shaker member to said grooves, said housing having projecting means extending horizontally inwardly from the inner sides thereof adapted to be moved downwardly at the cut away portions in the outer sides of the shaker members until said grooves are reached, whereupon the housing may be turned about its central vertical axis for said projecting means to traverse the grooves.

3. Two independent shaker members having each an upwardly extending hollow portion and a base at its lower end whereby each may be independently supported on its base, and each of said shaker members having a fixed top with a plurality of small outlet openings therethrough, said shaker members being adapted to be placed together, an enclosing housing open at its lower end and having a top at its upper end adapted to be telescoped over said shaker members until the lower end of the housing reaches substantially the bases thereof, said top having an opening therethrough of less area than the combined areas of the tops of said shaker members, and interengaging retaining means on said shaker members and housing adapted to be brought into operative relation on turning the housing about its central vertical axis after it has reached its lowermost position to releasably hold said housing and shaker members against disconnection, said housing being turnable about said axis to an indefinite number of positions whereby the opening in the top thereof may expose selected of the openings in the top of one or both of said shaker members.

4. Two independent shaker members, each having an upwardly extending hollow portion and a base at its lower end whereby each may be independently supported on its base, and each of said shaker members having a fixed top with a plurality of small outlet openings therethrough, said shaker members being adapted to be placed together side by side, an enclosing housing open at its lower end and adapted to be telescoped over said shaker members until the lower end of the housing reaches substantially the bases thereof, said housing having a top at its upper end and with an opening therethrough of less area than the combined areas of the tops of said shaker members, each of said shaker members between its upper and lower ends having a substantially horizontal groove therearound except at the adjacent sides of the shaker member adapted to be placed together, and said housing at its inner side having inwardly extending means of slightly less width than the width of said grooves adapted when the housing is fully telescoped over the shaker members to be received in said grooves, each of said shaker members at a side thereof above the grooves having a portion cut away to permit downward passage of said inwardly extending means to said grooves, thereby permitting the housing to be turned about its central vertical axis to retain the housing against longitudinal separation from said shaker members until moved to the position it had with reference to the shaker members when it was telescoped thereover.

5. A construction having the elements defined in claim 4, said top of the housing being located in a substantially horizontal plane and bowed downwardly to contact against the tops of the shaker members shortly before the end of said housing reaches its lowermost position and before said inwardly extending means from the housing reaches said grooves.

6. Two independent hollow shaker members having each a fixed top, and each having a side thereof, which sides are adapted to be brought into contact engagement to provide a substantially cylindrical body, each of said shaker members having outlet openings in its top and each of said independent shaker members having an enlarged base portion, a cylindrical housing to be passed over and located around and substantially enclosing said shaker members, said cylindrical housing having a top with an opening therethrough, and means for releasably connecting said housing with the shaker members to hold them together and with the housing movable about its longitudinal axis to different positions whereby said opening in the top of the housing may expose all of the openings in said shaker members, partially expose the openings in both shaker members, expose all of the openings in either of said shaker members or cover all of said openings in both, said cylindrical housing reaching substantially to the enlarged base portions of the shaker members when the housing is in retaining connection.

EDMUND C. HANLEY.